United States Patent [19]

Nakamura et al.

[11] 4,453,518

[45] Jun. 12, 1984

[54] ENGINE SPEED CONTROL SYSTEM

[75] Inventors: Mitsuo Nakamura, Tokyo; Fujio Matsui, Musashino, both of Japan

[73] Assignee: Fuji Jukogyo Kabushiki Kaisha, Tokyo, Japan

[21] Appl. No.: 331,768

[22] Filed: Dec. 17, 1981

[30] Foreign Application Priority Data

Dec. 24, 1980 [JP] Japan ................................ 55-183372

[51] Int. Cl.³ ........................ F02D 11/10; B60K 31/00

[52] U.S. Cl. ...................................... 123/361; 123/339

[58] Field of Search ......................... 123/339, 585, 361

[56] References Cited

U.S. PATENT DOCUMENTS

| | | | |
|---|---|---|---|
| 3,969,614 | 7/1976 | Moyer et al. | 235/150.21 |
| 4,112,885 | 9/1978 | Iwata et al. | 123/361 |
| 4,163,282 | 7/1979 | Yamada et al. | 364/431 |
| 4,344,399 | 8/1982 | Matsumura et al. | 123/339 |

*Primary Examiner*—Parshotam S. Lall
*Assistant Examiner*—W. R. Wolfe
*Attorney, Agent, or Firm*—John T. Roberts

[57] ABSTRACT

An engine idling speed control system for an internal combustion engine comprising an actuator for actuating a throttle valve for increasing and decreasing the idling speed, an engine speed signal generating circuit, an engine speed increasing signal generating circuit and an engine speed decreasing signal generating circuit, a vehicle speed signal generating circuit, an idling signal generating circuit for generating an idling signal in the idling operation of the engine, and an actuator control circuit for operating the actuator in opposite directions in accordance with engine speed increasing and decreasing signals. A time lag signal generating circuit is provided to be responsive to the engine speed signal and to the idling signal for producing a time lag signal. The time lag signal generating circuit is so arranged that duration of the time lag signal increases with the increase of the engine speed. A logic gate means is provided to be operated by the vehicle speed signal, idling signal and time lag signal for enabling the engine speed increasing and decreasing signals after the duration of the time lag signal.

4 Claims, 9 Drawing Figures

ENGINE SPEED CONTROL SYSTEM

CROSS REFERENCE TO RELATED APPLICATIONS

This invention is in part disclosed in a co-pending, commonly assigned application entitled Engine Speed Control System, Ser. No. 331,769, filed Dec. 17, 1981 still pending.

BACKGROUND OF THE INVENTION

The present invention relates to an engine speed control system for a vehicle, and more particularly to a system which starts to control the engine idling speed after an interval when the engine operation is changed from driving condition to idling condition.

Heretofore, a closed loop feedback control system has been provided for controlling the idling speed to a desired idling speed by adjusting the amount of air or the amount of the air-fuel mixture to be induced in the engine in dependency on an error signal which is the difference between a desired reference idling speed and the detected idling speed. The feedback control system stops controlling the idling speed in driving condition which is detected by a sensor. After the engine came into the idling operation, the control system starts to control the idling speed after a time lag. The reason why such a delay of control start is necessary is that if the control system starts to control the idling speed immediately after the engine operation has been changed to the idling operation at high speed or after the engine is raced at a high speed then overshoot control in the system will occur, which will cause further control delay to the predetermined idling speed.

In a conventional control system, the period of the control start delay or the time lag is set to a constant period of time. However, the constant time lag is not proper to control the idling speed when the difference between the actual idling speed and the reference idling speed is extremely small or large. That is, when the difference is very small, the time lag is excessively long to control the engine speed to the desired idling speed, and when the difference is very large, the time lag is relatively short, which will cause the abovementioned overshoot control.

SUMMARY OF THE INVENTION

The object of the present invention is to provide an idling speed control system in which the control start time lag is adjusted in accordance with the engine speed at the time when the engine comes into idling condition, whereby the engine speed may be controlled to a desired idling speed without delay.

According to the present invention, a time lag signal generating circuit is provided to be responsive to the engine speed when idling for producing a time lag signal. The time lag signal generating circuit is so arranged that duration of the time lag signal increases with the increase of the engine speed. The automatic idling speed control is started after the duration of the time lag signal.

Other objects and features of the present invention will be fully described with reference to the accompanying drawings.

DETAILED DESCRIPTION OF THE PREFERRED EMBODIMENTS

Figure 1:
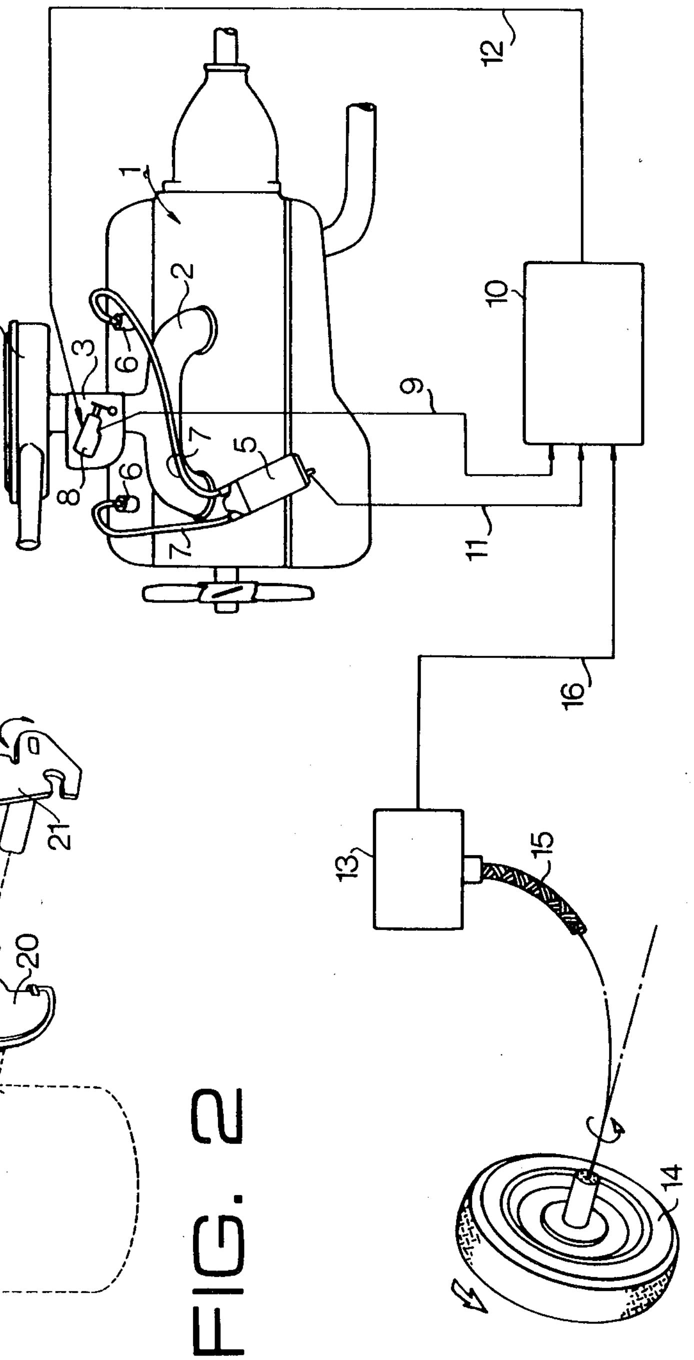
FIG. 1 is a schematic diagram showing a system of the present invention.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring to FIG. 1, an internal combustion engine 1 mounted on a vehicle is provided with an intake manifold 2, a carburetor 3, an air cleaner 4, an ignition coil 5, and spark plugs 6 connected to the ignition coil 5, respectively. An actuator 8 for operating a throttle valve in the carburetor is supported on the side wall of the carburetor 3. The actuator 8 includes an idling sensing switch. The idling signal produced by the idling sensing switch in the actuator 8 is sent to a control circuit 10 through a line 9. Pulses produced in synchronism with ignition pulses are also supplied to the control circuit 10 through a line 11. The output of the control circuit 10 is connected to the actuator 8 by a line 12.

A vehicle speed sensor 13 is connected to an axle for a front wheel 14 by a speedometer cable 15. Output of the vehicle speed sensor 13 is applied to the control circuit 10 by a line 16.

Figure 2:
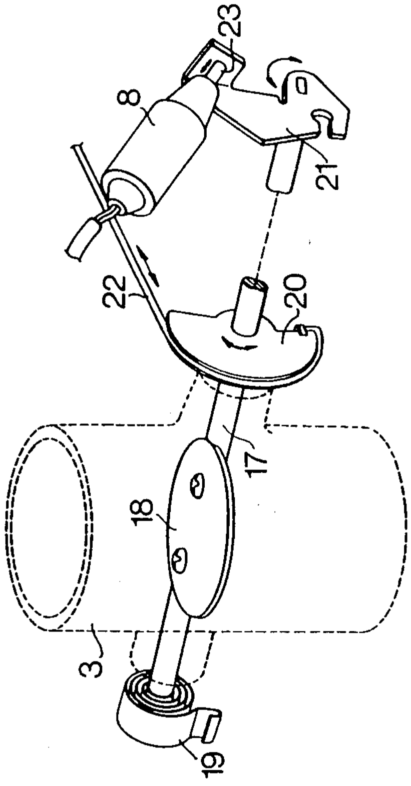
FIG. 2 is a perspective view showing a carburetor and attachments thereto.

Referring to FIG. 2, a throttle shaft 17 of a throttle valve 18 is rotatably mounted on the carburetor 3, one end of the throttle shaft 17 is secured to the inner end of a spring 19 which exerts a spring force on the throttle shaft 17 so as to close the throttle valve 18. A wire connector 20 and a lever 21 are secured to the other side of the throttle shaft.

Figure 3:
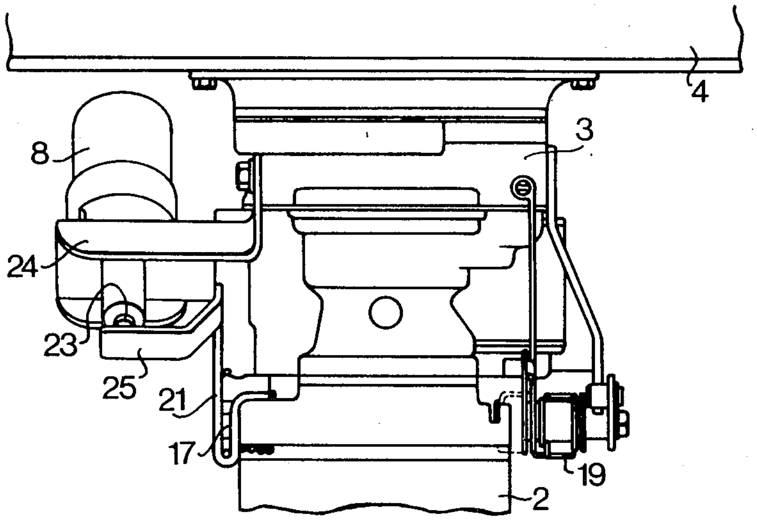
FIG. 3 is a front view of an actuator for the carburetor.
Figure 4:
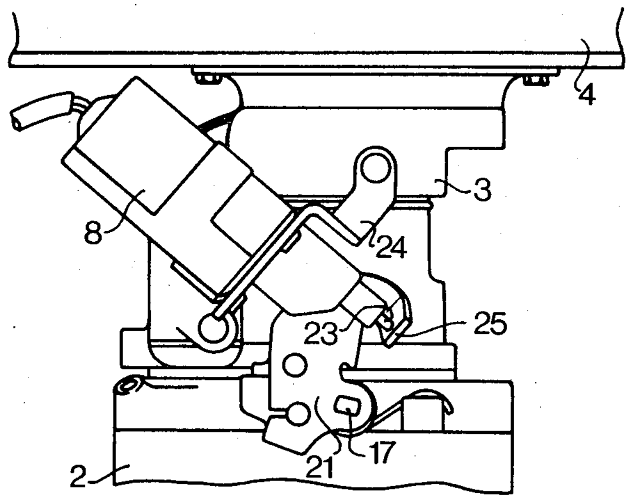
FIG. 4 is a side view of the actuator.

Referring to FIGS. 3 and 4, the actuator 8 is secured to a support 24 securely mounted on the carburetor 3. An end of an accelerator wire 22 connected to the accelerator pedal of the vehicle is fixed to the wire connector 20. The actuator includes a rod 23 which is operatively connected with a flange 25 of the lever 21 in FIG. 3.

Figure 5:
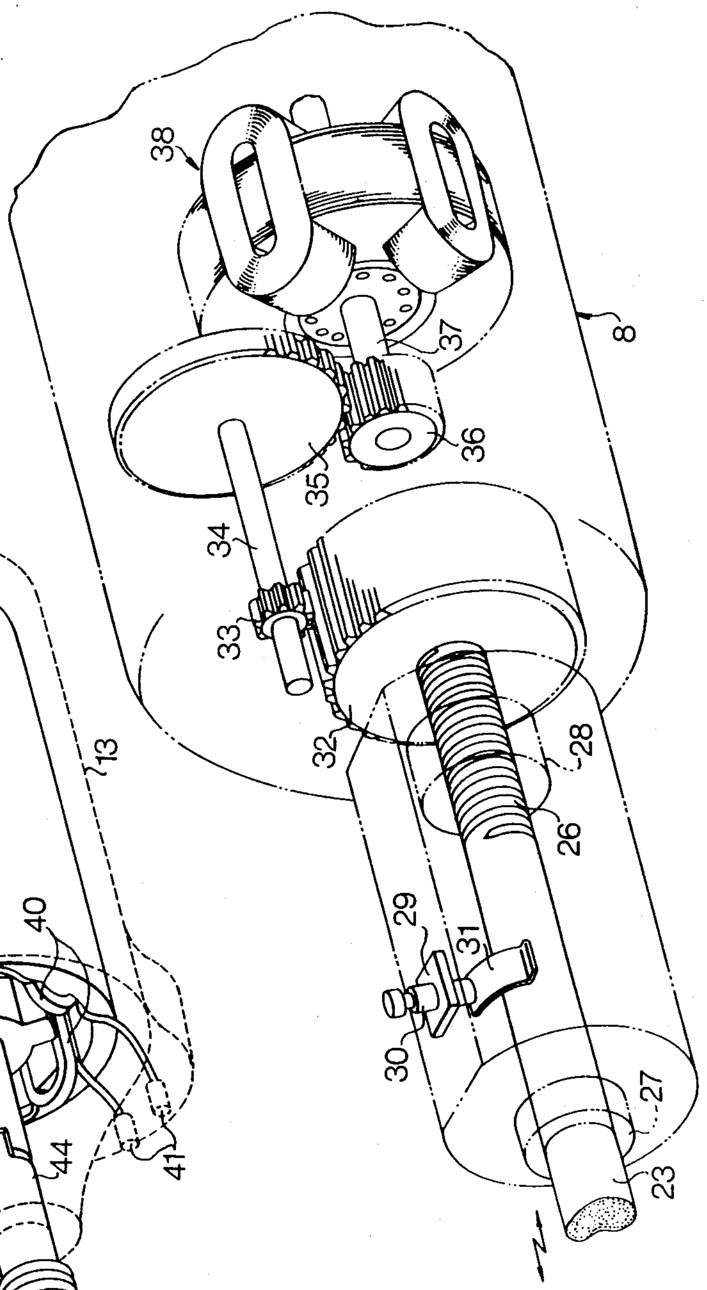
FIG. 5 is a perspective view showing internal construction of the actuator.

FIG. 5 shows an internal construction of the actuator 8. The rod 23 is rotatably mounted on bearing 27 and threaded bearing 28. The rod 23 is axially and integrally mounted on a gear 32. The rod is made of metal and bearings 27, 28 and a gear 32 are made of plastic for electrical insulation from the body of the actuator 8. A terminal 30 is secured to the body of the actuator through an insulation plate 29. A brush 31 fixed with the terminal 30 is connected with the periphery of the rod 23.

The gear 32 engages with a pinion 33 securetly mounted on a shaft 34, on the other end of which is fixedly mounted a gear 35 which is engaged with a pinion 36. The pinion 36 is secured to a shaft 37 of the motor 38.

Figure 6:
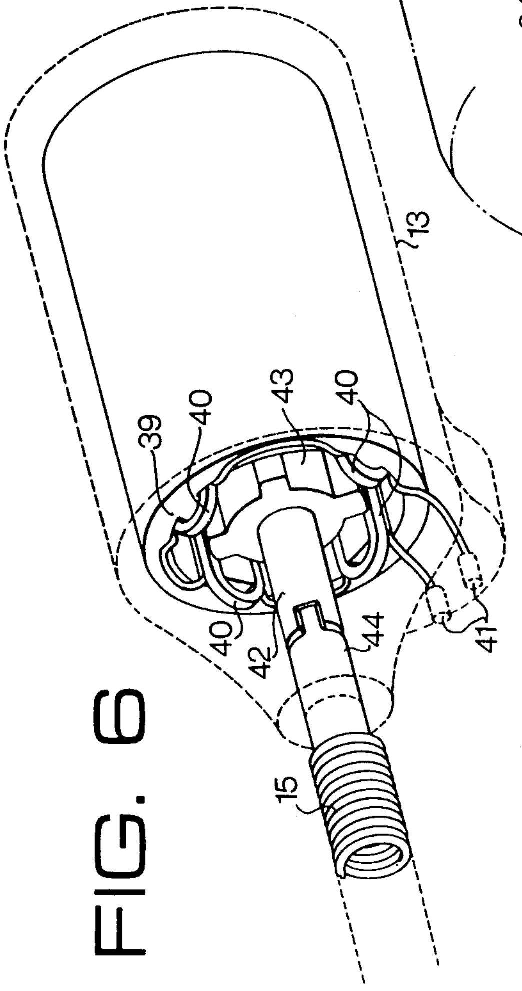
FIG. 6 is a perspective view showing a vehicle speed sensor.

Referring to FIG. 6, the vehicle speed sensor 13 comprises a cylindrical core 39 having coils 40 which are connected in series and connected to a pair of terminals 41, a rotor 43 secured to a shaft 42 which is connected to a speedometer cable 15 through a joint 44. Thus, rotation of the rotor 43 produces output voltage on terminals 41 according to the vehicle speed.

Figure 7:
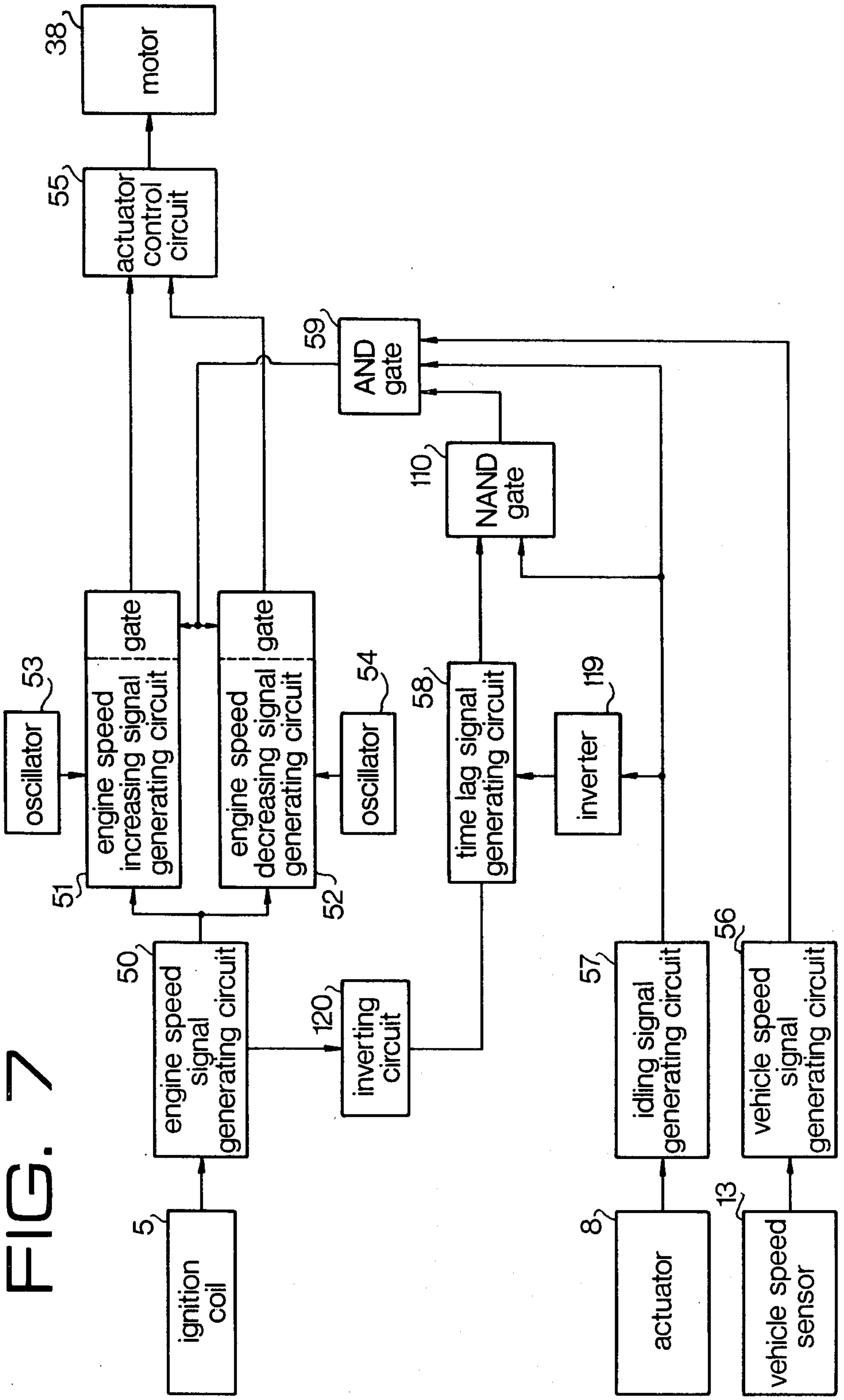
FIG. 7 is a block diagram of a control circuit employed in the system.
Figure 8:
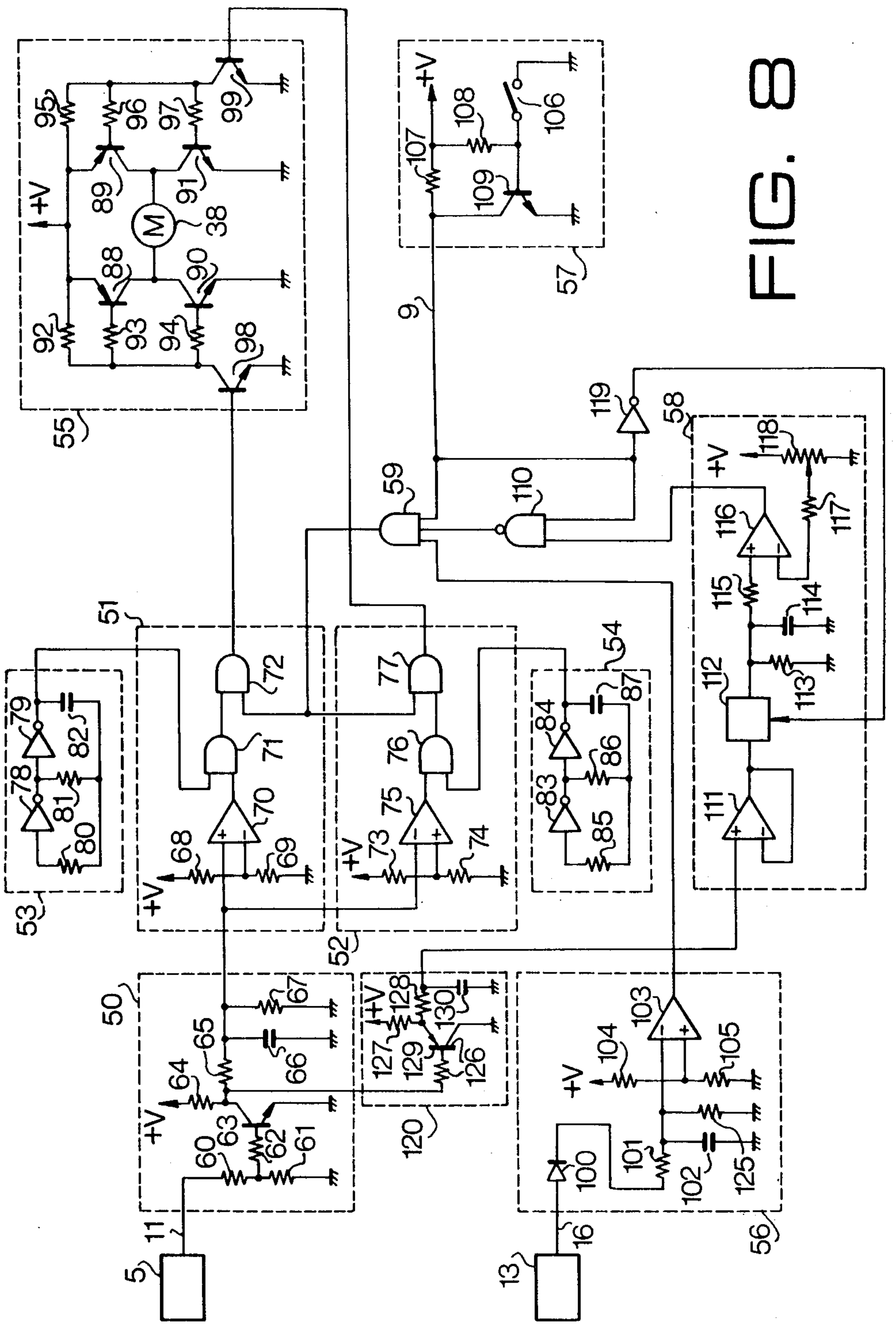
FIG. 8 is an electric circuit of the control circuit of FIG. 7.

Referring to FIGS. 7 and 8, the control circuit 10 generally comprises an engine speed signal generating circuit 50, an engine speed increasing signal generating circuit 51, which detects insufficient engine speed, an engine speed decreasing signal generating circuit 52, which detects excessive engine speed, oscillators 53 and 54, an actuator control circuit 55 for idling speed control, a vehicle speed signal generating circuit 56, an idling signal generating circuit 57, a time lag signal generating circuit 58, an AND gate 59 as a control gate for idling speed control, a NAND gate 110 and an inverting circuit 120.

The engine speed signal generating circuit 50 is applied with pulses from the ignition coil 5, which cause the switching of a transistor switching circuit comprising resistors 60, 61, 62 and a transistor 63. The collector of the transistor is connected to a positive source through a resistor 64 and to an integrating circuit comprising resistors 65, 67 and capacitor 66. Further, the collector of the transistor 63 is connected through a resistor 126 to a base of a transistor 129. The emitter of the transistor 129 is connected to the source through a resistor 127 and connected to a capacitor 130 through a resistor 128 to form an integrating circuit.

The output of the engine speed signal generating circuit 50 is connected to a noninverting input of a comparator 70 of the engine speed increasing signal generating circuit 51 and connected to an inverting input of a comparator 75 of the engine speed decreasing signal generating circuit 52. The inverting input of the comparator 70 is connected to a voltage divider comprising resistors 68 and 69 and the output thereof is connected to an AND gate 71. The output of the AND gate 71 is connected to an AND gate 72 for producing an engine speed increasing signal. The noninverting input of the comparator 75 is connected to a voltage divider comprising resistors 73 and 74, and the output thereof is connected to an AND gate 76. The output of the AND gate 76 is connected to an AND gate 77 for producing an engine speed decreasing signal. Oscillators 53 and 54 comprise inverters 78, 79, 83 and 84, resistors 80, 81, 85 and 86, and capacitors 82 and 87, respectively. Pulses from the oscillator 53 are applied to the AND gate 71 and pulses from the oscillator 54 are applied to the AND gate 76. AND gates 72 and 77 are applied with an output of the AND gate 59.

The actuator control circuit 55 for idling speed control has PNP transistors 88 and 89, NPN transistors 90 and 91, which are connected with each other in bridge form. The motor 38 is connected between collectors of two pair of transistors. The actuator control circuit 55 further comprises a pair of transistors 98 and 99 and resistors 92 to 97 for applying voltages to each transistor. The base of the transistor 98 is applied with an output of the AND gate 72, and the base of the transistor 99 is applied with an output of the AND gate 77.

The output of vehicle speed sensor 13 is connected to a diode 100 of the vehicle speed signal generating circuit 56, which is in turn connected to an inverting input of a comparator 103 through a resistor 101. A capacitor 102 and resistor 125 are also connected to the inverting input of the comparator. The noninverting input of the comparator 103 is connected to a voltage divider comprising resistors 104 and 105. The output of the comparator 103 is connected to one of the inputs of the AND gate 59.

The idling signal generating circuit 57 includes an idling sensing switch 106 which is formed by the end of the rod 23 and the end portion 25 of the lever 21. An end of the switch 106 is grounded and the other end is connected to the source through a resistor 108 and to a base of transistor 109. The collector of the transistor 109 is connected to the source through a resistor 107 and to one of the inputs of the AND gate 59.

The time lag signal generating circuit 58 comprises an operational amplifier 111 and an analogue switch 112. The operational amplifier 111 is amplified with a signal from the inverting circuit 120 and the control gate of the analogue switch 112 is supplied with a signal from the idling signal generating circuit 57 through an inverted 119. The output of the analogue switch 112 is connected to a noninverting input of a comparator 116 through a resistor 115 and to a resistor 113 and a capacitor 114. The inverting input of the comparator 116 is connected to a variable resistor 118 through a resistor 117. The output of the comparator 116 is connected to the NAND gate 110, output of which is connected to one of the inputs of the AND gate 59. The output of the idling signal generating circuit 57 is also connected to an input of the AND gate 110.

In operation, pulses proportional to ignition pulses are applied to the engine speed generating circuit 50. Rotation of the front wheel 14 causes the rotor 43 of the vehicle speed sensor 13 to rotate to generate output (alternating current) in proportion to the vehicle speed on terminals 41 (FIG. 6). As to the idling sensing switch 106, if the accelerator pedal is depressed for the acceleration of the engine, the end portion 25 of the lever 21 secured to the throttle shaft 17 is disengaged from the end of the rod 23, which means opening of the idling sensing switch 106.

Pulses applied to the engine speed signal generating circuit 50 turns on and off the transistor 63. The voltage on the end of the capacitor 66 varies in inverse proportion to the engine speed. The voltage at the capacitor 66 is applied to comparators 70 and 75. When the input voltage of the comparator 70 is higher than the lower limit reference voltage at the inverting input, which means low engine speed, a high level output signal is applied to the AND gate 71. The AND gate 71 produces pulses according to the input pulses from the oscillator 53, which are applied to the AND gate 72. When the input voltage of the comparator 75 decreases below the upper limit reference voltage at the noninverting input, which means the engine speed becomes high, a high level output signal is applied to the AND gate 76. The AND gate 76 produces pulses which are applied to the AND gate 77 similarly to the operation of the AND gate 71.

Figure 9:
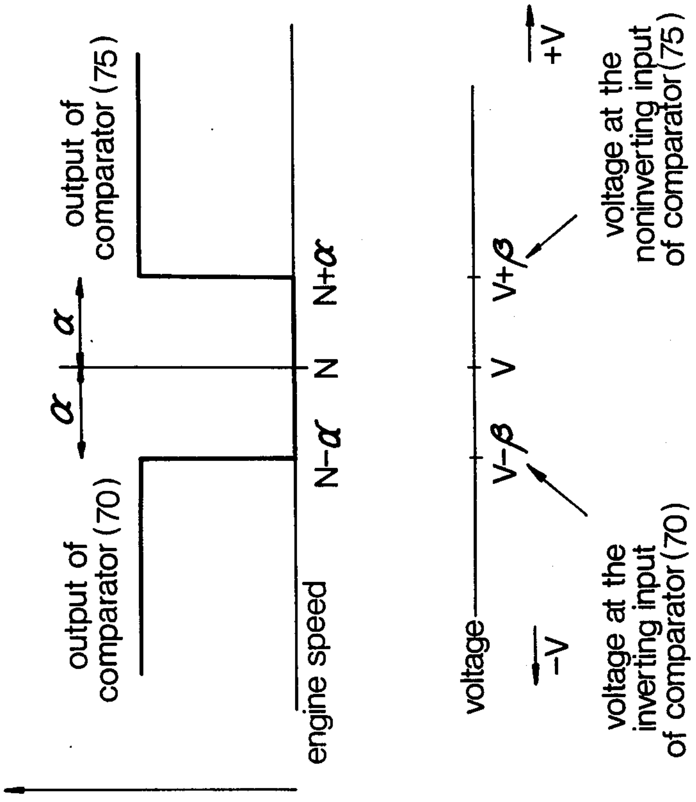
FIG. 9 is a graph showing outputs of comparators in the control circuit.

Referring to FIG. 9, $V-\beta$ is the lower limit reference voltage at the inverting input of the comparator 70 and $V+\beta$ is the higher limit reference voltage at the noninverting input of the comparator 75. Therefore, the comparator 70 produces the high level output at the engine speed $N-\alpha$ corresponding to the voltage $V-\beta$ and the comparator 75 produces the output at the engine speed $N+\alpha$ corresponding to the voltage $V+\beta$. Accordingly, there is provided a non-operation zone $\alpha+\alpha$ on both sides of a desired idling speed N.

The vehicle speed signal from the vehicle speed sensor 13 is applied to the comparator 103 through the diode 100. When the vehicle speed signal exceeds a predetermined level of the input signal at the noninverting signal of the comparator 103, output of the comparator 103 changes from a high level to a low level. The changing of the output is made at a low vehicle speed, for example at 8 Km/h.

When the idling sensing switch 106 is off, that is the lever 21 is disengaged from the rod 23, the transistor 109 is turned on, so that the idling signal on the line 9 is at a low level. However, if the idling sensing switch 106 is on, the transistor 109 is turned off, so that the idling signal goes to a high level.

In the time lag signal generating circuit 58, the input proportional to the engine speed is amplified by the operational amplifier 111 and applied to the analogue switch 112. When the idling signal is at a low level (the accelerator pedal is depressed), the analogue switch is turned on by the high level control signal from the inverter 119. Thus, the output of the operational amplifier 111 is charged in the capacitor 114 and applied to the noninverting input of the comparator 116. Since the input voltage to the comparator 116 is proportional to the engine speed, the output of the comparator is at a high level, which is applied to the NAND gate 110. Thus, the NAND gate 110 is applied with the high level output of the time lag signal generating circuit 58 and with the low level idling signal on the line 9, thereby producing a high level output.

When the idling signal is at a high level, the output of the NAND gate goes to a low level. On the other hand, since the control signal to the analogue switch 112 is at a low level, the switch is turned off. Therefore, when the voltage at the capacitor 114 (at the positive terminal of the comparator 116) becomes lower than the voltage at the negative terminal of the comparator 116, the comparator produces a low level output. Thus the output of the NAND gate 110 changes to a high level.

It will be seen that AND gates 72 and 77 produce a high level output only when the input applied from the AND gate 59 is at a high level. The AND gate 59 produces a high level output when all inputs applied from the vehicle speed signal generating circuit 56, idling signal generating circuit 57, and NAND gate 110 are at high levels. The conditions are as follows:

(A) Vehicle speed is lower than a predetermined speed;

(B) The lever 21 engages the end of the rod 23 (idling state); and, (C) The output of the NAND gate 110 is at a high level in dependency on the input applied from the time lag signal generating circuit 58.

Under these conditions, the AND gate 59 produces a high level output to allow AND gates 72 and 77 to control the idling speed.

When engine idling speed is lower than the speed $N-\alpha$ (FIG. 9), the comparator 70 produces a high level output which actuates the AND gate 71 to produce pulses. The pulses are applied to the base of the transistor 98 through the AND gate 72 to periodically turn on the transistor. As a result, the transistors 88 and 91 are turned on, so that current passes through the transistor 88, motor 38, and transistor 91, which causes the rotation of the motor 38 in one direction. The rotation of the motor is transmitted to the rod 23 through the gears 36, 35, 33 and 32, so that the rod 23 is projected to push the lever 21. Thus, the throttle valve 18 is rotated to increase the engine idling speed.

When the engine idling speed exceeds the speed $N+\alpha$, the comparator 75 produces a high level output, so that the transistor 99 is turned on in a similar manner to the circuit 51. Thus, transistors 89 and 90 are turned on and the motor 38 is caused to reverse rotate, so that the rod 23 is retracted. The throttle valve 18 is closed to decrease engine idling speed. Thus, the engine idling speed is automatically maintained to the desired idling speed N.

Conditions for which the above-described idling speed control is not activated are as follows:

(D) Vehicle speed is higher than a predetermined value and the output of the circuit 56 changes to a low level; or (E) Engine is accelerated and the idling sensing switch 106 is opened, so that the idling signal goes to a low level; or (F) A short period after the engine operation has come into idling operation.

Under any one of the conditions, the output of the AND gate 59 goes to a low level thereby to stop the motor control operation.

Describing hereinafter the operation in the condition (F), when the engine comes into idling operation, the lever 21 engages the rod 23 (closing of the switch 106), so that the idling signal changes to a high level. The idling signal is sent to the AND gate 59, NAND gate 110 and analogue switch 112. Although the analogue switch 112 is opened, if the voltage charged in the capacitor 114 is high owing to high engine speed, the voltage keeps the output of the comparator 116 in high level. Thus, the output of the NAND gate 110 is at a low level and hence AND gates 72 and 77 are closed, so that the automatic speed control is not effected. However, the voltage charged in the capacitor 114 gradually decreases due to the discharge through the resistor 113, and at last the output of the comparator 116 changes to a low level. This period of time is the time lag for delaying the automatic speed control operation. The low level output of the comparator 116 causes the output of the NAND gate 110 to go to a high level, which results in opening of AND gates 72 and 77 and starting of the automatic speed control.

Since the voltage charged in the capacitor 114 is proportional to the engine speed, the time lag increases with increase of the engine speed. The time lag is adjusted by selecting resistances of resistors 113, 115, 117, 118 and the capacitance of the capacitor 114.

From the foregoing, it will be understood that the present invention provides an engine speed control system which operates to start controlling of idling speed with a time lag when the engine operation comes into the idling operation at a high speed, and the time lag is automatically adjusted in accordance with the engine speed at the beginning of the idling operation, whereby the idling speed may be controlled without delay.

Although the present invention has been described with reference to a particular embodiment thereof, it should be understood that those skilled in the art may make many other modifications and embodiments thereof which will fall within the spirit and scope of the principles of this invention.

What is claimed as new and desired to be secured by patent of the United States is:

1. An engine speed control system for an internal combustion engine having a throttle valve operatively connected with an actuator for actuating said throttle valve which comprises:

(a) a vehicle speed signal generating circuit for generating a vehicle speed signal only when the vehicle speed is lower than a predetermined low value;

(b) an idling signal generating circuit for generating an idling signal in the idling operation of said engine;

(c) an engine speed signal generating circuit for producing an engine speed signal dependent on the engine speed;

(d) a time lag signal generating circuit responsive to said engine speed signal and to said idling signal for producing a time lag signal;

(e) said time lag signal generating circuit being so arranged that duration of said time lag signal increases with the increase of said engine speed;

(f) a logic gate means generating a signal when applied with a signal from said vehicle speed signal generating circuit, said idling signal generating circuit, and said time lag signal generating circuit;

(g) a first comparing circuit for comparing said engine speed signal with a predetermined reference value representing when said engine speed is below a first certain level and generating an engine speed increasing signal when applied with signal from said logic gate means;

(h) a second comparing circuit for comparing said engine speed signal with a predetermined reference value representing when said engine speed is above a second certain level, above said first certain level and generating an engine speed decreasing signal when applied with a signal from said logic gate means;

(i) an actuator control circuit for operating said actuator in opposite directions in accordance with said engine speed control signals;

whereby said throttle value is opened, closed or unmoved to perform an automatic idling speed control.

2. An engine speed control system according to claim wherein said engine has an ignition system and said engine speed signal generating circuit is so arranged as to produce the engine speed signal in response to ignition pulses of said ignition system.

3. An engine speed control system according to claim 1 wherein said actuator comprising an electric motor and said actuator control circuit comprises a bridge form switching circuit responsive to said engine speed increasing signal and to said engine speed decreasing signal for driving said motor in opposite directions.

4. An engine speed control system according to claim wherein said time lag signal generating circuit includes a switch operated by said idling signal for stopping said charging of said capacitor.

* * * * *